C. S. BEMENT.
Machines for Lining Carpenters' Squares.

No. 155,063.                  Patented Sept. 15, 1874.

Witnesses                  Charles S. Bement
                              Inventor
                              By atty

UNITED STATES PATENT OFFICE.

CHARLES S. BEMENT, OF NEW HAVEN, CONNECTICUT, ASSIGNOR TO SARGENT & CO., OF SAME PLACE.

IMPROVEMENT IN MACHINES FOR LINING CARPENTERS' SQUARES.

Specification forming part of Letters Patent No. 155,063, dated September 15, 1874; application filed January 21, 1874.

*To all whom it may concern:*

Be it known that I, CHARLES S. BEMENT, of New Haven, in the county of New Haven and State of Connecticut, have invented a new Improvement in Machines for Lining Carpenters' Squares; and I do hereby declare the following, when taken in connection with the accompanying drawings and the letters of reference marked thereon, to be a full, clear, and exact description of the same, and which said drawings constitute part of this specification, and represent, in—

Figure 1:
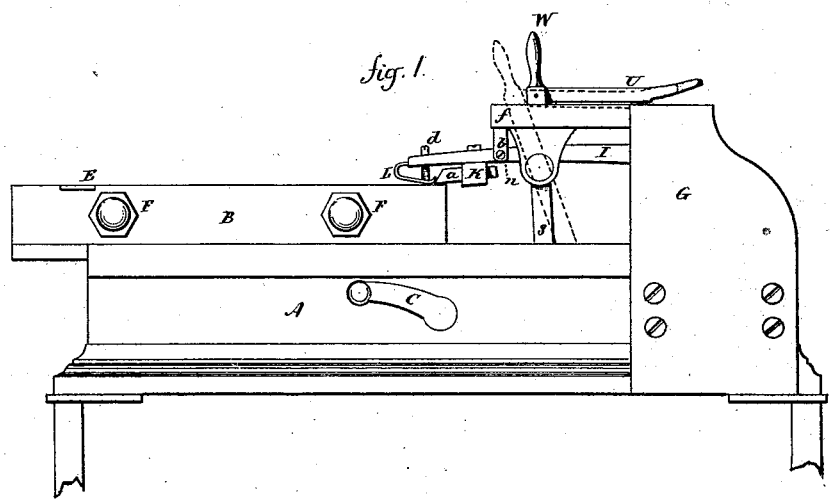
Figure 2:
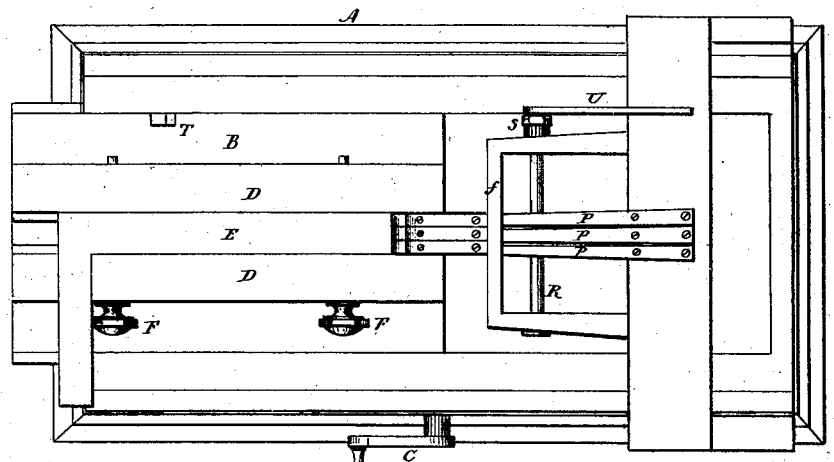
Figures 3, 5:
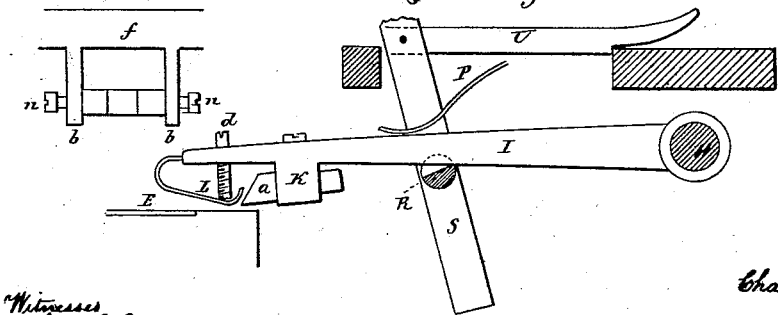
Figure 4:

Figure 1, a side view; Fig. 2, a top view; Fig. 3, a detached side view of a marker, enlarged; Fig. 4, an end view; and in Fig. 5, a detached front view of the arms to illustrate the transverse adjustment.

This invention relates to an improvement in apparatus for performing that part of the labor upon carpenters' squares known as lining—that is to say, the parallel lines which run longitudinally on the blades. The object of this invention is to facilitate the work; and it consists in combining with a reciprocating bed, constructed to hold the square to be lined, a tool to cut one of the lines, and an automatic device for throwing the tools out at any desired point where the cut is complete.

A is the frame of the machine, upon which is arranged, in suitable guides, a bed, B, and provided with suitable mechanism for moving the bed longitudinally back and forth on the frame, here represented as by means of a crank, C, in connection with the bed. On the bed are arranged a pair of parallel jaws, D, between which the blade E of the square is clamped by means of screws F or other convenient means. On uprights G at the rear of the frame A, and on a shaft, H, one or more arms, I, are hung. These arms extend forward, as seen in Fig. 1, and as seen in Fig. 3, enlarged, and near the forward end the tool *a* is secured in a holder, K. This tool is formed with sharp cutting-points, more or less in number, on its cutting-edge; but if more than one they should be distant from each other according to the space between the lines required, so that one cutter will run several lines. Forward of the cutter on the arm a guide, L, is hung, made adjustable by a set-screw, *d*, the guide extending down and inclined toward the edge of the cutter, and so as to ride upon the blade directly in front of the cutter; hence, this guide resting upon the blade, the cutters will only enter the blade to the extent this cutter lies below this guide, and will run onto the end of the blade before the cutter strikes it. Thus, as the thickness of the blade varies, or the surface is uneven, the guide, lying in close proximity to the cutter, will govern the cut accordingly, and cause it to run to the same depth at all points on the surface, whatever may be the variableness of that surface. An independent spring, P, bears upon each arm to hold it down to its work, but yet allow it to be raised whenever occasion requires. After the lines are cut it is desirable to raise the cutter that it may not ride upon the blade on its return. To do this I arrange a shaft, R, beneath the arms, of cam shape, as seen in Fig. 3, so that by turning the shaft into the position seen in Fig. 3 the arms will be raised clear from the work; but when the cam is thrown back, then the arm will drop, bringing the tool down to the work. To automatically operate the cam-shaft R, I attach a lever, S, thereto, which extends down to the bed, and on the bed I arrange a stop, T, (see Fig. 2,) so that when the line is made to the desired extent it will strike the lower end of the lever S, carrying it over to the position denoted in broken lines, Fig. 1, and as seen in Fig. 3, raising the cutters from the work; and to hold the cutters up I attach a latch, U, to the lever, which, when the lever has been carried sufficiently far to raise the cutters, will lock upon the frame or other desired point, as seen in Fig. 3, and hold the cutters raised until the latch is disengaged. The lever S is provided with a handle, W, by which at any time the cutters may be raised. To adjust the arms transversely, should occasion require, they are placed between projections *b*, extending down from a frame, *f*, and through these projections an adjusting-screw, $n$, is set to bear against the arms, as seen in Fig. 5, and by means of screws these arms may be adjusted to the right or left.

I claim as my invention—

In combination with the reciprocating bed B, provided with a device for holding the square, the arms I, carrying the cutter $a$, and the cam-shaft R, the lever S upon the said cam-shaft, and the stop T on the bed for operating the said cam-shaft, substantially as described.

CHARLES S. BEMENT.

Witnesses:
A. J. TIBBITS,
J. H. SHUMWAY.